United States Patent
Tanaami et al.

(10) Patent No.: US 7,115,883 B2
(45) Date of Patent: Oct. 3, 2006

(54) DETECTOR CALIBRATION METHOD AND POWER MEASUREMENT INSTRUMENTS USING THE METHOD

(75) Inventors: Takeo Tanaami, Musashino (JP); Yumiko Sugiyama, Musashino (JP); Saya Satou, Musashino (JP); Hisao Katakura, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 235 days.

(21) Appl. No.: 10/702,430

(22) Filed: Nov. 7, 2003

(65) Prior Publication Data

US 2004/0113096 A1    Jun. 17, 2004

(30) Foreign Application Priority Data

Dec. 12, 2002 (JP) .............................. 2002-360653

(51) Int. Cl.
  *G01N 21/64* (2006.01)
  *G01J 5/00* (2006.01)
(52) U.S. Cl. .................................. 250/458.1
(58) Field of Classification Search ............ 250/458.1
  See application file for complete search history.

(56) References Cited

U.S. PATENT DOCUMENTS 5,620,842 A * 4/1997 Davis et al. ................. 435/4
6,583,424 B1 * 6/2003 Staton et al. ............. 250/461.2
6,919,919 B1 * 7/2005 Nelson et al. .............. 348/187
2004/0064053 A1 * 4/2004 Chang et al. ............... 600/478

FOREIGN PATENT DOCUMENTS

JP    2001-311690 A    11/2001

OTHER PUBLICATIONS

Toru Makino, et al. (Japanese Journal of Optics) magazine, vol. 28 No. 10 (1999), pp. 549 to 552.

* cited by examiner

*Primary Examiner*—Constantine Hannaher
(74) *Attorney, Agent, or Firm*—Westerman, Hattori, Daniels & Adrian, LLP.

(57) ABSTRACT

Detector calibration methods are described which enable the measurement of absolute power. The method includes using a power meter with traceability to the national standard for optical power to calibrate the power of each photodetector device of a detector with photodetector device arrays arranged in one dimension or two dimensions and to calibrate the output signals of the detector making it possible to measure the spatial distribution of a light source's power and also values of optical power with traceability to the national standard directly from the output signals of the detector.

5 Claims, 3 Drawing Sheets

DETECTOR CALIBRATION METHOD AND POWER MEASUREMENT INSTRUMENTS USING THE METHOD

BACKGROUND OF THE INVENTION

1. Field of the Invention

The present invention relates to a calibration method for detectors and to power measurement instruments using a detector calibrated according to the calibration method. Detectors are, for example, cameras with a photodetector part comprising a plurality of photodetector devices.

2. Description of the Prior Art

Conventionally, DNA chips have been used for identification and fractionation (for example, detection of DNAs or detection of whether gene DNAs exist or not) of, for example, biopolymers.

In DNA chips, fragments of known DNAs, for example, in thousands of or tens of thousands of types are fixed in each of the sites on a substrate. When fragments of unknown DNAs are run onto these DNA chips, DNAs of the same type are hybridized and combined. After unknown DNAs that have not been combined are removed through rinsing, excitation light (laser light) is irradiated to the remaining DNAs. Unknown DNAs are labeled with fluorescent substances beforehand. Excited fluorescent substances irradiated by excitation light generate fluorescence. As a result, light and dark areas appear in each site corresponding to whether hybridization has occurred or not.

This observation of light and dark areas is performed with such equipment as fluorescent scanning instruments using confocal laser optical systems as, for example, described in "DNA Analyses and Optical Technologies" by Toru Makino and Kyoichi Kano in "Optical Technologies in Life Science" of the "KOGAKU (Japanese Journal of Optics)" magazine, Volume 28 No. 10 (1999), pages 549 to 552, published in 1999 by the Optical Society of Japan, a division of the Japan Society of Applied Physics. For example, photomultipliers that enable highly sensitive detection are used for detectors in fluorescence observation.

Although power meters are used for detectors in some cases, power meters can only perform detection in zero dimensions in a spaceand, therefore, cannot measure precisely samples with shapes such as biochips including DNA chips or plasma displays.

Because these samples has intensity patterns caused by their shapes.

In the meantime, these conventional detectors such as fluorescent scanning instruments have the following problems because they cannot measure absolute power:

(1) It is not possible to compare values of detectors' output signals among instruments.

(2) Since the amount of gene expression is not known in biochip measurements, the only method is to mix, for example, known genes and perform comparative measurements, thereby causing such instruments to become expensive.

SUMMARY OF THE INVENTION

An object of the present invention is to solve said problems by providing a calibration method for detectors, which enables the measurement of absolute power with sample shapes.

Another object of the present invention is to use a detector calibrated according to the calibration method and to provide a power measurement instrument which makes it possible to estimate, for example, the number of fluorescent molecules directly with sample shapes.

DETAILED DESCRIPTION OF THE PREFERRED EMBODIMENTS

Figure 1A:
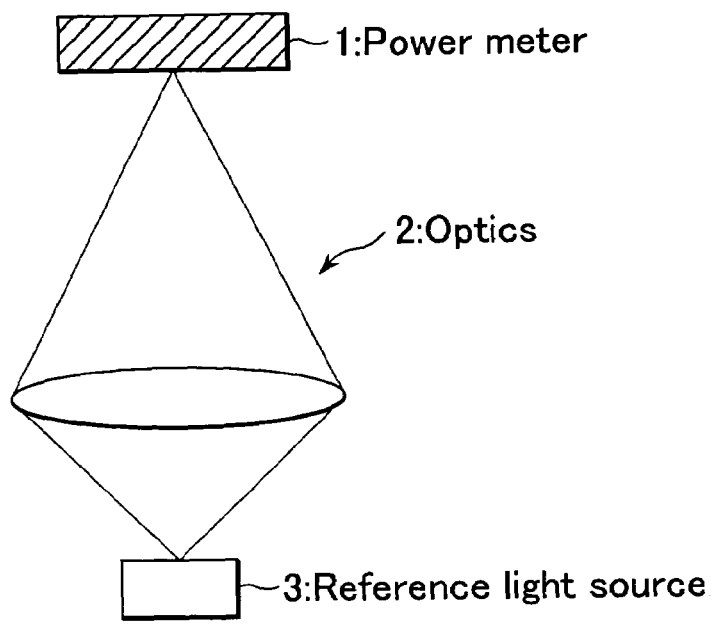
FIG. 1 illustrates the principle of a calibration method concerning the present invention.

The above-mentioned drawings are used to explain the present invention in detail as follows. FIG. 1 illustrates the principle of a calibration method concerning the present invention. FIG. 1(a) shows a power meter 1, an optics 2, and a reference light source 3 such as LED.

The power meter 1 provides traceability according to the national standard for optical power and conforms to the national standard. This power meter 1 measures the power of the reference light source 3 via the microscope 2. The power of the reference light source 3 is calibrated with reference to the power meter 1.

Figure 1B:
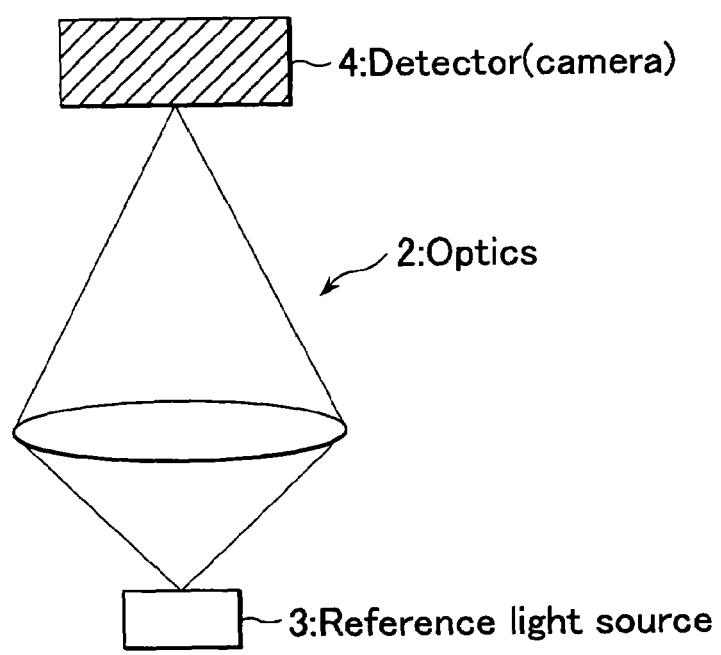

Next, as shown in FIG. 1(b), the calibrated power of the reference light source 3 is detected with a photodetector device of the detector (such as a camera) 4 via the optics 2. This detection makes it possible to calibrate the relationship between the power of the photodetector device of the camera 4 and the output signal of the camera.

Figure 2:
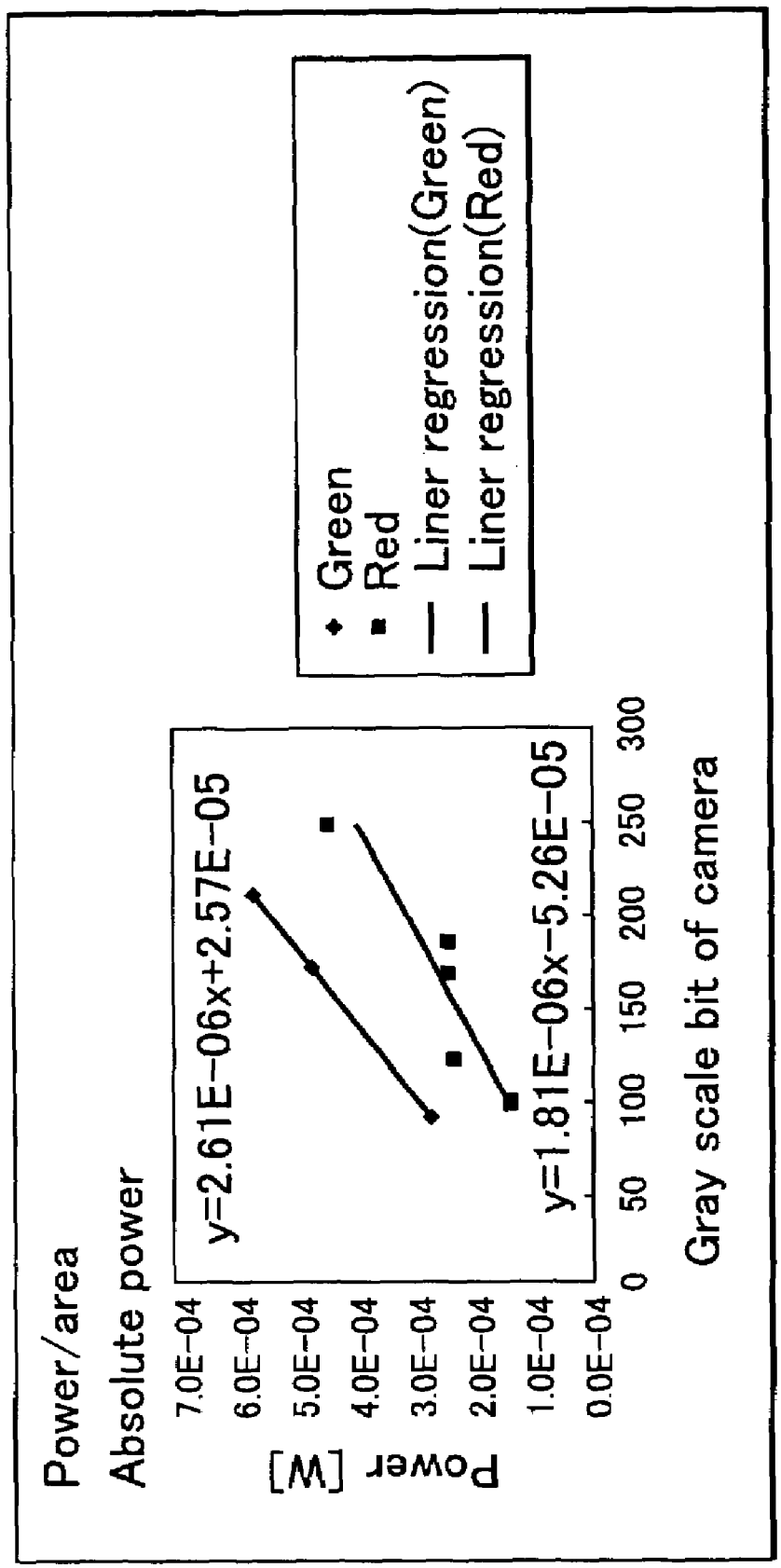
FIG. 2 shows an example of calibrated results.

FIG. 2 shows an example of calibrated results according to this calibration method. FIG. 2 shows the relationship between the absolute power for each unit area of the photodetector device and the gradation of the camera's luminance signal outputs. If the light source 3 is a green light, the relationship is $Y=2.61\text{E}-06X+2.57\text{E}-05$. If the light source is a red light, the relationship is $Y=1.81\text{E}-06X-5.26\text{E}-05$. "X" and "Y" in these equations are gradation and power respectively.

If a camera calibrated in this manner is used for a detector of a biochip reader (for example, a biochip reader described in the Japanese Laid-open Patent Application 2001-311690 proposed by the applicant of the application concerned), fluorescent power can be directly measured from a gradation value of a measured image.

On the other hand, power generated from a fluorescent dye can be obtained from the processing below. Power $\Delta I$ of the light absorbed by the fluorescent dye is provided by the following equation:

$$\Delta I = 2.3 \times 10^3 \times \alpha \times Io \times n/(Na \times S) \; [W] \quad (1)$$

where,

α: molar absorbance coefficient, $8 \times 10^4$ [M$^{-1}$ cm$^{-1}$]
Io: incident power [W]
N: number of molecules [count]
Na: Avogadro's number, $6 \times 10^{23}$
S: area [cm$^2$]

It is possible to estimate the fluorescent power generated from a fluorescent dye by taking into account the quantum efficiency and other aspects.

Therefore, it is possible to directly estimate the number of fluorescent molecules "n" on a biochip by comparing the value of the fluorescent power measured through the use of a camera calibrated according to said calibration method and the value of the fluorescent power estimated as above with the pattern of the each sites (spots).

Note that the present invention is not confined to the above example and may include a number of changes or alterations without departing from the spirit or essential characteristics thereof.

For example, it is possible to measure not only biochips but also ordinary cells, dust (fluorescent dust) in semiconductor processes, fluorescent coating materials such as plasma panels, etc.

Figure 3:
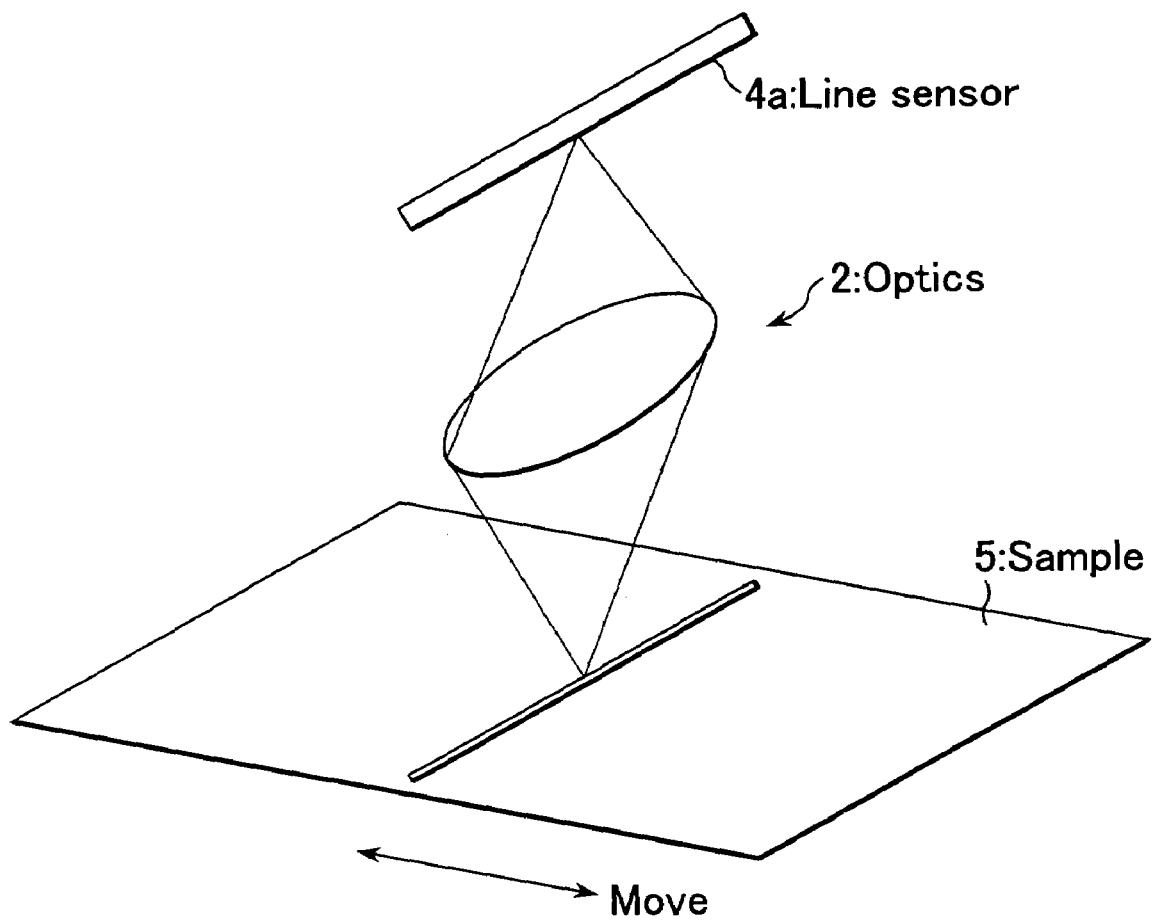
FIG. 3 shows an example of using photodetector devices arranged in one dimension.

For detectors, it is also possible to use not only a so-called two-dimensional array, where photodetector devices are arranged in two dimensions, but also a line sensor $4a$, where photodetector devices are arranged in one dimension, as shown in FIG. 3. In this case, a stage (not illustrated) may be added to move a sample 5 in a direction that is orthogonal to the arrangement direction of the line sensor $4a$, to detect two-dimensional images of the sample.

Moreover, it may be possible to insert a power amplification system such as an image intensifier between a camera and the optics. This makes it possible to measure very weak light. In this case, it is necessary to perform calibrations with the inclusion of the image intensifier.

Accordingly, the present invention provides the following benefits:

(1) It is possible to measure absolute accurate power directly from the outputs of the each pixel of the image pattern of a camera with a detection part comprising arrayed photodetector devices, because a power meter with traceability to the national standard is used to calibrate power and camera outputs with respect to each photodetector device, and cancel the intensity pattern caused by their shapes.

(2) The use of a camera calibrated in this manner makes it possible to easily reduce errors in power measurements among instruments for fluorescence measurements.

(3) Since the number of fluorescent molecules is also obtained, process management indicators can be clarified to facilitate the improvement of sample handling processes and also more accurate measurements.

(4) Moreover, since dummy samples added for reference can also be reduced, costs can easily be reduced.

What is claimed is:

1. A detector calibration method, comprising:
   calibrating the power and output signals of each photodetector device of a detector with photodetector device arrays arranged in one dimension or two dimensions using a power meter with traceability to the national standard of optical power,
   wherein the spatial distribution of a light source's power and values of optical power can be measured with traceability to the national standard directly from the output signals of the detector pixels.

2. The detector calibration method of claim 1, wherein said detector is calibrated by calibrating a reference light source with said power meter, measuring the reference light source with the detector, and then calibrating the output signal of the detector based on the light power calibrated to the power meter.

3. The detection calibration method of claim 1 or claim 2, wherein said detector is a camera with a photodetector part comprising a plurality of pixels.

4. A power measuring method, comprising the steps of:
   calibrating a detector according to the detector calibration method described in claim 1 or claim 2, and
   measuring biochips, cells, fluorescent coating materials, or fluorescent dust.

5. A power measuring method, comprising the steps of:
   calibrating a detector, which is equipped with a means of calculating the number of molecules in a fluorescent object, according to the detector calibration method described in claim 1 or claim 2, and
   calculating the power or the number of molecules of a fluorescent object using the output signals of the detector which detects fluorescent power from the fluorescent object, and the formula for the power generated from fluorescent dye.

* * * * *